Oct. 8, 1946. W. HYRE Re 22,799

FORM ALIGNER

Original Filed Dec. 26, 1944 2 Sheets-Sheet 1

Inventor
Warren Hyre,
By Karl Fenning
his Attorney

Oct. 8, 1946. W. HYRE Re 22,799
FORM ALIGNER
Original Filed Dec. 26, 1944 2 Sheets-Sheet 2
Fig. 7
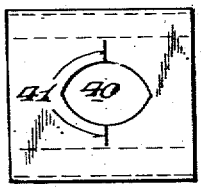
Fig. 8
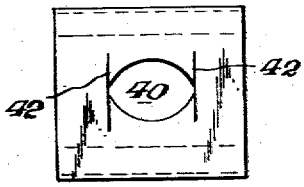
Fig. 9
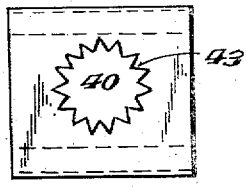
Fig. 2
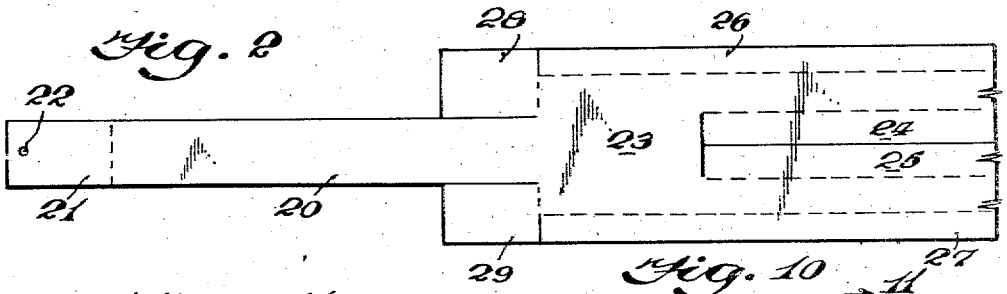
Fig. 10
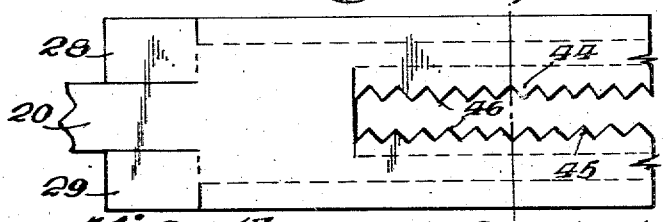
Fig. 11
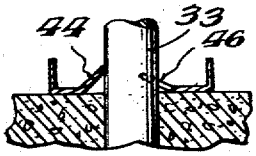
Fig. 15
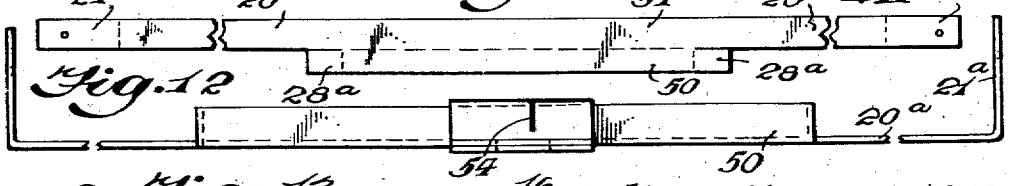
Fig. 12
Fig. 13
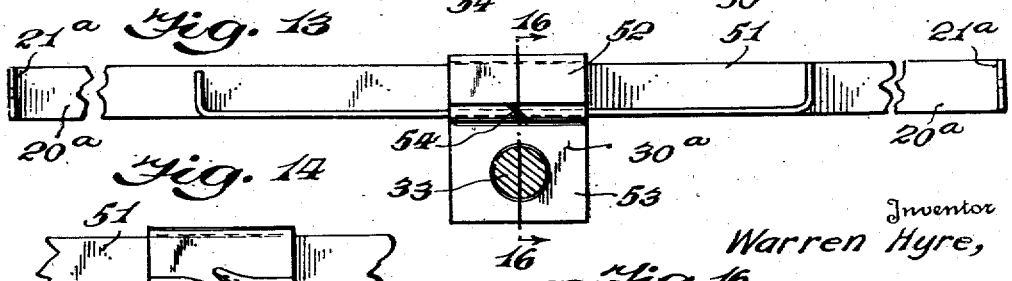
Fig. 14
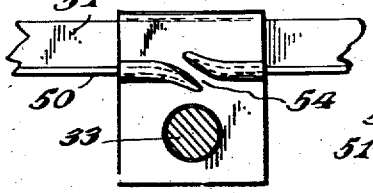
Fig. 16
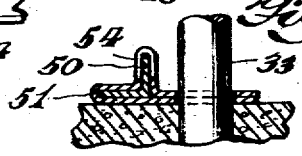
Inventor
Warren Hyre,
By Karl Hansing
his Attorney Reissued Oct. 8, 1946

Re. 22,799

UNITED STATES PATENT OFFICE 22,799

FORM ALIGNER

Warren Hyre, Clearwater, Fla.

Original No. 2,378,850, dated June 19, 1945, Serial No. 569,800, December 26, 1944. Application for reissue February 21, 1946, Serial No. 649,340

10 Claims. (Cl. 25—131)

The invention relates to means for positioning and holding the form for a cast concrete wall and has particularly to do with mechanism for positioning or aligning the form on a previously prepared footing from which there project the usual dowel pins which are to extend into and engage the completed cast wall.

In general the invention comprises a strip or strap of metal which has means for engaging the dowel pin and may be adjusted with respect thereto. The engaging means may be a sliding member. The metallic strap may also be provided with stops or seats for holding and positioning the walls of the form for the wall to be cast.

In the accompanying drawings

Figure 1:
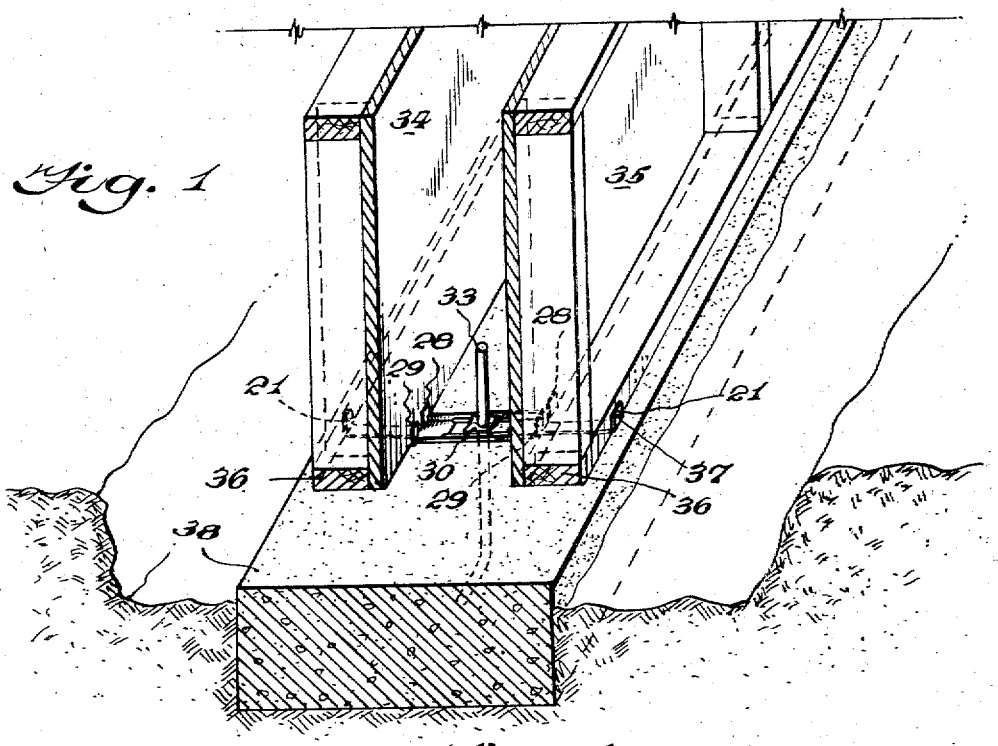
Figure 3:
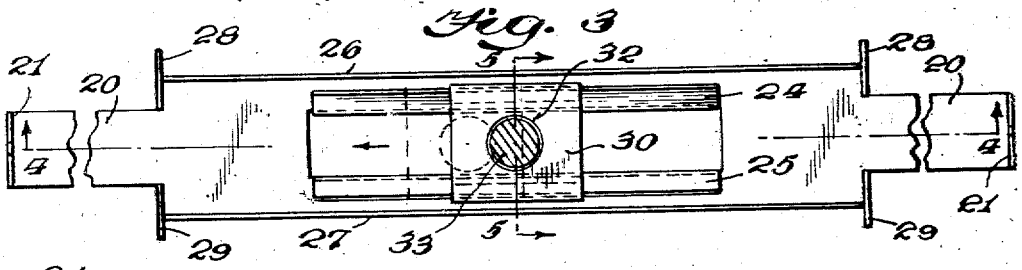
Figure 4:
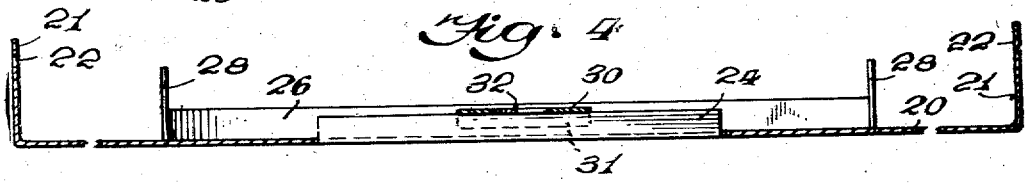
Figures 5, 6:
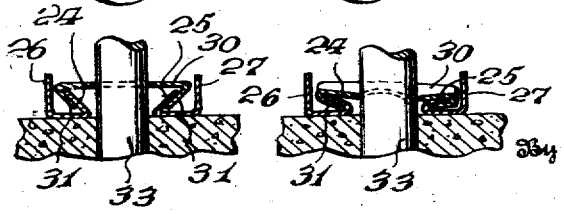

Figure 1 is a perspective view of form walls in position on a form aligner engaged and held by a dowel pin projecting from a footing. Fig. 2 is a fragmentary plan view of a blank from which a form aligner may be made. Fig. 3 is a plan view of a form aligner in position to be used. Fig. 4 is a transverse vertical section of the aligner of Fig. 3. Figs. 5 and 6 are transverse sections on the line 5—5 of Fig. 3, showing the positioning mechanism in different conditions. Figs. 7, 8 and 9 are plan views of optional forms the sliding member may take. Fig. 10 is a fragmentary plan view of a blank for making an optional form of form aligner. Fig. 11 is a transverse section on line 11—11 of Fig. 10 showing the device applied to a dowel pin. Fig. 12 is a side elevation of an optional form of form aligner. Fig. 13 is a plan view of the device shown in Fig. 12. Fig. 14 is a fragmentary plan view of the device of Fig. 13 showing the sliding member fixed in position. Fig. 15 is a plan view on a reduced scale of a blank for making the device of Fig. 12; and Fig. 16 is a transverse vertical section on the line 16—16 of Fig. 13.

Fig. 2 shows about one-half of a blank from which the form aligner of Figs. 3 and 4 may be made. At each end there is a projecting tongue 20 having an end member 21 which may be turned upwardly and is preferably provided with a perforation 22. The body of the blank 23 is cut at its center so as to provide two wing members 24 and 25 which may be turned upwardly and outwardly as indicated in Figs. 3, 4 and 5. At the edges of the blank of Fig. 2, are strips 26 and 27 which may be turned upwardly and the cut members 28 and 29 at the base of the tongue 20 may be turned upwardly as indicated in Figs. 3 and 4. The members 28, 29 rest against the ends of strips 26, 27 and are braced thereby.

A positioning member 30, with downwardly turned edges 31 (see Fig. 5), may be inserted over the ends of the members 24 and 25 and may slide thereon. The member 30 is provided at its center with a hole 32 which may be placed over the dowel pin 33. The device may thus take the position indicated in Fig. 1.

The dowel pins 33 are placed in and project from the footing 38 but they are not positioned with any accuracy therein. In general they are placed along a line approximating the center of the footing 38. When the member 30 is placed over the dowel pin 33 the members 24 and 25 are free to slide in it so that the whole device may be adjusted laterally on the footing 38.

The position to be taken by the outer side of the wall to be cast is determined generally by the carpenter's line or cord which is fixed from the batter board which has been properly located on or above the surface of the ground. It will be understood of course that the footing 38 is generally in a position below the surface of the ground and therefore not readily accessible for continuous measurements or adjustments. A plumb bob dropped from the carpenter's line to the footing 38 in the usual way may be employed to locate the line on the footing which the outer side of the wall to be cast should take. The members 28 and 29 of the device may be positioned by the plumb bob by sliding the members 24 and 25 through the member 30 which is engaged with the dowel pin 33. When the members 28 and 29 have been brought to the proper position to fix the outer side of the wall to be cast, a blow of a hammer or other device on the member 30 may deform it and the members 24 and 25 in such a way as to hold the entire mechanism in the position determined by the plumb line. The result of this pinching and positioning blow is illustrated in Fig. 6, in which the member 30 has been jammed against a depressed portion of the members 24 and 25. Thus, the members 28 and 29 are accurately positioned in a plurality of successive devices along the footing 38. The distance between the members 28 and 29 in the left hand end of the device, as shown in Fig. 3, and the equivalent members 28 and 29 at the right hand side of the device is predetermined to equal the thickness of the wall to be cast. Thus, one form member 34 to determine one side of the wall to be cast may be placed against the position members 28 and 29 and the opposite form member 35 may be placed against the other or opposite members 28 and 29, and when the cement is cast the wall will be properly aligned or positioned and of the proper predetermined thickness. Any usual or desired reinforcing means may be inserted between the form walls. At the ends of the tongues 20, the upwardly turned members 21 may be positioned from the members 28 and 29 a sufficient distance to receive between the members 21 and 28, 29 not only the frame wall board 34 but also a blocking or positioning longitudinal member 36 which may be of 2 x 4 or other standard size. A nail 37 may be driven through the hole 22 in the upwardly turned member 21 at each end of the device to hold the frame together and in proper position. By this means, it will be seen that the base of the wall frame may be properly positioned on the footing 34. The upwardly extending ends of the form members 34 and 35 may also be brought into proper relation in any suitable way such as by carpenter's line and batter board on or above the surface of the ground.

Thus, when the form members 34 and 35 are held in position on the footing 38 and are then erected vertically, the position of the entire wall will definitely be determined. Heretofore it has been customary to relay upon so positioning the upper ends of the form members. While this may be sufficient in some instances it sometimes becomes necessary to definitely and accurately position the entire wall not merely at the top but at the bottom. This may be especially important when the wall is being placed on a property line. It may be necessary to keep the line within one-eighth of an inch of accuracy not merely at the top but also at the bottom. It will be seen that the present device is admirably adapted to accomplish this purpose.

As indicated in Fig. 3, the hole 32 in the sliding member 30 is practically the same size as the cross section of the dowel pin 33 and this may be a preferable arrangement and may be convenient at times. The dowel pins 33, however, are not always the same size nor are they made with great care as to accuracy. It may be desirable, therefore, to have a device with a hole which may be capable of adapting itself to different sizes and irregularities of dowel pins 33. It may be, therefore, instead of cutting the simple hole indicated in Figs. 3 and 4 to provide one or another of the openings indicated in Figs. 7, 8 and 9. In Fig. 7 is shown an oval hole 40 joined by transverse cuts 41 so that the dowel pin may be forced through the hole 40 and cause the metal to deform or be relieved at the cuts 41 so as to rightly clasp the dowel pin 33. In Fig. 8 a similar oval hole 40 is shown with transverse cluts 42 at the ends of the hole 40 so as to accommodate dowel pins of vary sizes and shapes. In Fig. 9 the hole 40 is provided with a serrated edge made up of serrations or teeth 43 to allow engagement with dowel pins of varying sizes.

In Figs. 10 and 11 is shown an optional arrangement which omits the sliding member 30. The aligning member blank substitutes for the members 24 and 25 similar cut-out members 44 and 45, the edges of which are slightly separated and provided with serrations or teeth 46. The members 44 and 45 may be turned upwardly as indicated at the left in Fig. 11. In such position the device may be placed over the dowel pin 33 and may be out of actual engagement therewith. In this position the device may be shifted laterally on the footing 38 until it reaches the desired position when a blow of a hammer or other device on the serrated members 44 and 45 at the sides of the dowel pin 33 may cause the serrations

46 to take the position indicated at the right hand side of Fig. 11 and thus hold the device against lateral movement on the dowel pin 33. It will be understood of course that the other members, as shown in Fig. 3, such as 28, 29, 20 and 21, will be present and employed as indicated above.

In Figs. 12, 13 and 14 is shown an optional form of construction. A strip of metal as indicated in Fig. 15 may be cut so as to allow the tongues 28*a* to be turned upwardly and then the entire edge 50 between the tongues 28*a* may be turned upward and the edges of the strips 28*a* lie against the base 51 of the strip which is provided at its ends with extending tongues 20*a* whose terminal ends 21*a* are turned upwardly as indicated in Figs. 12 and 13. A separate strap of metal 52 may be shaped to loosely surround and slide upon the members 50, 51 as indicated in Fig. 16. The projecting ends 53 of the member 52 are perforated to engage the dowel pin 33. The device then may be properly adjusted on the footing 38 and a chisel or other device placed in the slot 54 provided in the sliding member 52. A blow on the chisel may then deform the device as indicated in Fig. 14 and hold the mechanism in the proper adjusted position to form the necessary seat at the proper place for the walls of the form.

The holding members such as 21 and 28 have been indicated as separated a sufficient distance to receive not merely the form walls 35 and 34 but also the longitudinal positioning and reinforcing members 36. Of course the longitudinal members 36 may be omitted when desired and the distance between the members 21 and 28 may be only sufficient to receive the edge of the form boards 34 and 35 without additional bracing.

While the device has been described as being made from a strip or sheet of metal it will be understood that it or some parts of it may be cast or otherwise produced.

The term "dowel pin" as used in the claims is not confined to the usual projecting pins in footings or foundation walls but also includes pins or the like inserted in the footing or other basic concrete before it fully sets for use in positioning and holding the form sides in accordance with my invention. While the invention is described as specifically useful with foundation walls, the term footing is used to include any base on which it is desired to erect a wall.

Changes and variations in the structure may be made without departing from the invention.

I claim as my invention:

1. Means for locating form sides for a concrete wall to be cast on a footing provided with dowel pins extending into the wall, comprising seats for the bottoms of the sides, means for connecting the seats, and means on the connecting means for engaging a dowel pin in a transversely adjusted position.

2. Means for locating form sides for a concrete wall to be cast on a footing provided with dowel pins extending into the wall, comprising seats for the bottoms of the sides, means for connecting the seats, and means for engaging a dowel pin sliding on the connecting means and arranged and adapted to be rigidly fixed thereon.

3. Means for locating form sides for a concrete wall to be cast on a footing provided with dowel pins extending into the wall, comprising seats for the bottoms of the sides, means for connecting the seats, and transversely adjustable means on the connecting means for engaging a dowel pin.

4. Means for locating form sides for a concrete wall to be cast on a footing provided with dowel pins extending into the wall, comprising a metal strip forming seats for the bottoms of the sides, and means on the strip between the seats for engaging a dowel pin in a transversely adjusted position.

5. Means for locating form sides for a concrete wall to be cast on a footing provided with dowel pins extending into the wall, comprising a metal strip, upwardly turned ends of the strip engaging the form, upwardly turned edges of part of the strip forming seats for the form sides between the ends of the edges and the upturned ends, upwardly turned leaves in the central portion of the strip forming a slot therebetween which slides on a dowel pin, and means on the edges of the leaves to grip the dowel pin.

6. Means for locating form sides for a concrete wall to be cast on a footing provided with dowel pins extending into the wall, comprising a metal strip, upwardly turned ends of the strip engaging the form sides, upwardly turned edges of part of the strip forming seats for the form sides between the ends of the edges and the upturned ends, and means sliding on the strip between the upwardly turned edges engaging a dowel pin and arranged and adapted to be rigidly fixed on the strip.

7. Means for loating form sides for a concrete wall to be cast on a footing provided with dowel pins extending into the wall, comprising a metal strip, upwardly turned ends of the strip engaging the form sides, upwardly turned edges of part of the strip forming seats for the form sides between the ends of the edges and the upturned ends, and means between the upwardly turned edges of the strip for engaging the dowel pin.

8. Means for locating form sides for a concrete wall to be cast on a footing provided with dowel pins extending into the wall, comprising a metal strip, upwardly turned ends of the strip engaging the form sides, upwardly turned edges of part of the strip forming seats for the form sides between the ends of the edges and the upturned ends, upwardly and outwardly inclined leaves cut from the central portion of the strip, and a member having downwardly and inwardly turned edges engaging the leaves and provided with a perforation to surround a dowel pin.

9. Means for locating form sides for a concrete wall to be cast on a footing provided with dowel pins extending into the wall, comprising a metal strip, means surrounding the strip and sliding thereon engaging a dowel pin, upwardly turned ends of the strip engaging the form sides, and stops on the strip on both sides of the sliding means forming seats for the form sides between them and the upturned ends.

10. Means for locating form sides for a concrete wall to be cast on a footing provided with dowel pins extending into the wall, comprising a metal strip, means sliding on the strip engaging a dowel pin and arranged and adapted to be rigidly fixed on the strip, upwardly turned parts of the strip engaging the form sides, and stops on the strip on both sides of the sliding means forming seats for the form sides between the stops and the upwardly turned parts of the strip.

WARREN HYRE.